US009952651B2

(12) United States Patent
Allen-Ware et al.

(10) Patent No.: US 9,952,651 B2
(45) Date of Patent: *Apr. 24, 2018

(54) DETERMINISTIC CURRENT BASED FREQUENCY OPTIMIZATION OF PROCESSOR CHIP

(71) Applicant: International Business Machines Corporation, Armonk, NY (US)

(72) Inventors: Malcolm S. Allen-Ware, Austin, TX (US); Michael S. Floyd, Cedar Park, TX (US); Joshua D. Friedrich, Round Rock, TX (US); Charles R. Lefurgy, Austin, TX (US); Kirk D. Peterson, Jericho, VT (US); Karthick Rajamani, Austin, TX (US); Srinivasan Ramani, Cary, NC (US); Todd J. Rosedahl, Zumbrota, MN (US); Gregory S. Still, Raleigh, NC (US); Brian W. Thompto, Austin, TX (US); Victor Zyuban, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/814,870

(22) Filed: Jul. 31, 2015

(65) Prior Publication Data

US 2017/0031415 A1 Feb. 2, 2017

(51) Int. Cl.
*G06F 1/00* (2006.01)
*G06F 1/32* (2006.01)

(52) U.S. Cl.
CPC .......... *G06F 1/324* (2013.01); *G06F 1/3203* (2013.01); *G06F 1/3206* (2013.01);
(Continued)

(58) Field of Classification Search
None
See application file for complete search history.

(56) References Cited

U.S. PATENT DOCUMENTS 6,823,516 B1 11/2004 Cooper
7,650,518 B2 1/2010 Allarey et al.
(Continued)

OTHER PUBLICATIONS

Woligroski, D., "AMD's Kabini: Jaguar and GCN Come Together in a 15 W APU", May 23, 2013, 24 pages.
(Continued)

*Primary Examiner* — Nitin Patel
(74) *Attorney, Agent, or Firm* — Patterson + Sheridan, LLP

(57) ABSTRACT

A system for adjusting a frequency of a processor is disclosed herein. The system includes a processor and a memory, where the memory includes a program configured to adjust a frequency of a multi-core processor. The operations include determining a total current and a temperature of the multi-core processor and estimating a leakage current for the multi-core processor. The operations also include calculating a switching current by subtracting the leakage current from the total current and calculating an effective switching capacitance based at least in part on the switching current. The operations also include calculating a workload activity factor by dividing the effective switching capacitance by a predetermined effective switching capacitance stored in vital product data, and enforcing a turbo frequency limit of the multi-core processor based on the workload activity factor.

13 Claims, 6 Drawing Sheets

(52) U.S. Cl.
CPC ........ *G06F 1/3243* (2013.01); *Y02B 60/1217* (2013.01); *Y02B 60/1239* (2013.01)

(56) References Cited

U.S. PATENT DOCUMENTS

| | | |
|---|---|---|
| 7,900,069 B2 | 3/2011 | Allarey |
| 8,024,590 B2 | 9/2011 | Song et al. |
| 8,245,070 B2 | 8/2012 | Finkelstein et al. |
| 8,510,582 B2 | 8/2013 | Naffziger et al. |
| 8,560,869 B2 | 10/2013 | Allarey |
| 8,769,316 B2 | 7/2014 | Ananthakrishnan et al. |
| 8,775,833 B2 | 7/2014 | Ananthakrishnan et al. |
| 8,779,846 B2 | 7/2014 | Allen-Ware et al. |
| 8,869,152 B1 | 10/2014 | Abrishami et al. |
| 8,892,931 B2 | 11/2014 | Kruglick |
| 8,943,340 B2 | 1/2015 | Ananthakrishnan et al. |
| 8,959,369 B2 | 2/2015 | de Cesare et al. |
| 9,223,383 B2 | 12/2015 | Manne et al. |
| 9,280,172 B2 | 3/2016 | Allarey et al. |
| 9,335,813 B2 * | 5/2016 | Burns .................... G06F 1/324 |
| 9,360,918 B2 | 6/2016 | Manne et al. |
| 9,372,803 B2 | 6/2016 | Manne et al. |
| 9,568,982 B1 | 2/2017 | Allen-Ware et al. |
| 9,588,823 B2 | 3/2017 | Rajappa et al. |
| 2005/0046400 A1 | 3/2005 | Rotem |
| 2006/0047987 A1 | 3/2006 | Prabhakaran et al. |
| 2008/0005592 A1 | 1/2008 | Allarey et al. |
| 2008/0104425 A1 | 5/2008 | Gunther et al. |
| 2008/0189569 A1 | 8/2008 | Chu |
| 2011/0320835 A1 | 12/2011 | Browning |
| 2012/0072746 A1 | 3/2012 | Sotomayor |
| 2012/0144215 A1 | 6/2012 | Naffziger et al. |
| 2012/0254643 A1 | 10/2012 | Fetzer et al. |
| 2013/0111226 A1 | 5/2013 | Ananthakrishnan et al. |
| 2013/0286026 A1 * | 10/2013 | Kaburlasos ............. G06F 1/324 345/501 |
| 2014/0181413 A1 | 6/2014 | Manne et al. |
| 2014/0181537 A1 | 6/2014 | Manne et al. |
| 2014/0237272 A1 * | 8/2014 | Sadowski ............. G06F 1/3275 713/320 |
| 2015/0355705 A1 | 12/2015 | Weissmann et al. |

OTHER PUBLICATIONS

Rotem, E., et al., "Power management architecture of the 2nd generation Intel® Core™ microarchitecture, formerly codenamed Sandy Bridge", Intel, Sandy Bridge—Hot Chips, Aug. 2011, 33 pages.

Jahagirdar, S., et al., "Power Management of the Third Generation Intel Core Micro Architecture formerly codenamed Ivy Bridge", Intel, Ivy Bridge—Hot Chips, 2012, 49 pages.

De Gelas, J., "Intel Xeon E5 Version 3: Up to 18 Haswell EP Cores", AnandTech, http://www.anandtech.com/print/8423/intel-xeon-e5-version-3-up-to-18-haswell-ep-cores, Sep. 8, 2014, 43 pages.

International Business Machines, "Appendix P: List of IBM Patents or Patent Applications Treated as Related," Jul. 31, 2015, 1 page.

De Gelas, J., "Intel Xeon E5 Version 3: Up to 18 Haswell EP Cores", AnandTech, Sep. 8, 2014, [Accessed Online Jul. 5, 2017] http://www.anandtech.com/show/8423/intel-xeon-e5-version-3-up-to-18-haswell-ep-cores.

U.S. Application entitled "Management of Core Power State Transition in a Microprocessor", filed Aug. 24, 2015.

US Application entitled "Deterministic Current Based Frequencey Optimization of Processor Chip," filed Aug. 24, 2015.

* cited by examiner

Frequency Uplift relative to Turbo 3.226GHz: Turismo, 12 core, slow sort TB mode, 690uOhm Load Line, 360A VRM limit, 247W (TM)

| AC | 12 cores active | 11 cores active | 10 cores active | 9 cores active | 8 cores active | 7 cores active | 6 cores active | 5 cores active | 4 cores active | 3 cores active | 2 cores active | 1 cores active |
|---|---|---|---|---|---|---|---|---|---|---|---|---|
| 1.00 | 0.0% | 4.1% | 8.7% | 13.8% | 19.1% | 24.7% | 24.7% | 24.7% | 24.7% | 24.7% | 24.7% | 24.7% |
| 0.95 | 1.4% | 5.6% | 10.2% | 15.2% | 20.4% | 24.7% | 24.7% | 24.7% | 24.7% | 24.7% | 24.7% | 24.7% |
| 0.90 | 2.9% | 7.0% | 11.6% | 16.7% | 21.9% | 24.7% | 24.7% | 24.7% | 24.7% | 24.7% | 24.7% | 24.7% |
| 0.85 | 4.4% | 8.5% | 13.1% | 18.1% | 23.5% | 24.7% | 24.7% | 24.7% | 24.7% | 24.7% | 24.7% | 24.7% |
| 0.80 | 5.9% | 10.1% | 14.7% | 19.5% | 24.7% | 24.7% | 24.7% | 24.7% | 24.7% | 24.7% | 24.7% | 24.7% |
| 0.75 | 7.5% | 11.7% | 16.3% | 21.0% | 24.7% | 24.7% | 24.7% | 24.7% | 24.7% | 24.7% | 24.7% | 24.7% |
| 0.70 | 9.2% | 13.4% | 17.9% | 22.8% | 24.7% | 24.7% | 24.7% | 24.7% | 24.7% | 24.7% | 24.7% | 24.7% |
| 0.65 | 10.9% | 15.1% | 19.5% | 24.6% | 24.7% | 24.7% | 24.7% | 24.7% | 24.7% | 24.7% | 24.7% | 24.7% |
| 0.60 | 12.7% | 16.9% | 21.2% | 24.7% | 24.7% | 24.7% | 24.7% | 24.7% | 24.7% | 24.7% | 24.7% | 24.7% |
| 0.55 | 14.6% | 18.7% | 23.2% | 24.7% | 24.7% | 24.7% | 24.7% | 24.7% | 24.7% | 24.7% | 24.7% | 24.7% |
| 0.50 | 15.4% | 20.5% | 24.7% | 24.7% | 24.7% | 24.7% | 24.7% | 24.7% | 24.7% | 24.7% | 24.7% | 24.7% |
| 0.45 | 15.4% | 20.8% | 24.7% | 24.7% | 24.7% | 24.7% | 24.7% | 24.7% | 24.7% | 24.7% | 24.7% | 24.7% |
| 0.40 | 15.4% | 20.8% | 24.7% | 24.7% | 24.7% | 24.7% | 24.7% | 24.7% | 24.7% | 24.7% | 24.7% | 24.7% |
| 0.35 | 15.4% | 20.8% | 24.7% | 24.7% | 24.7% | 24.7% | 24.7% | 24.7% | 24.7% | 24.7% | 24.7% | 24.7% |
| 0.30 | 15.4% | 20.8% | 24.7% | 24.7% | 24.7% | 24.7% | 24.7% | 24.7% | 24.7% | 24.7% | 24.7% | 24.7% |
| 0.25 | 15.4% | 20.8% | 24.7% | 24.7% | 24.7% | 24.7% | 24.7% | 24.7% | 24.7% | 24.7% | 24.7% | 24.7% |
| 0.20 | 15.4% | 20.8% | 24.7% | 24.7% | 24.7% | 24.7% | 24.7% | 24.7% | 24.7% | 24.7% | 24.7% | 24.7% |
| 0.15 | 15.4% | 20.8% | 24.7% | 24.7% | 24.7% | 24.7% | 24.7% | 24.7% | 24.7% | 24.7% | 24.7% | 24.7% |
| 0.10 | 15.4% | 20.8% | 24.7% | 24.7% | 24.7% | 24.7% | 24.7% | 24.7% | 24.7% | 24.7% | 24.7% | 24.7% |
| 0.05 | 15.4% | 20.8% | 24.7% | 24.7% | 24.7% | 24.7% | 24.7% | 24.7% | 24.7% | 24.7% | 24.7% | 24.7% |
| 0.00 | 15.4% | 20.8% | 24.7% | 24.7% | 24.7% | 24.7% | 24.7% | 24.7% | 24.7% | 24.7% | 24.7% | 24.7% |

FIG. 5A

WOF Frequency (absolute): Turismo, 12 core, slow sort TB mode, 690uOhm Load Line, 360A VRM limit, 247W (TM)

| AC | 12 cores active | 11 cores active | 10 cores active | 9 cores active | 8 cores active | 7 cores active | 6 cores active | 5 cores active | 4 cores active | 3 cores active | 2 cores active | 1 cores active |
|---|---|---|---|---|---|---|---|---|---|---|---|---|
| 1.00 | 3.226 | 3.360 | 3.508 | 3.672 | 3.844 | 4.024 | 4.024 | 4.024 | 4.024 | 4.024 | 4.024 | 4.024 |
| 0.95 | 3.271 | 3.406 | 3.554 | 3.718 | 3.885 | 4.024 | 4.024 | 4.024 | 4.024 | 4.024 | 4.024 | 4.024 |
| 0.90 | 3.318 | 3.453 | 3.601 | 3.765 | 3.933 | 4.024 | 4.024 | 4.024 | 4.024 | 4.024 | 4.024 | 4.024 |
| 0.85 | 3.367 | 3.503 | 3.650 | 3.810 | 3.985 | 4.024 | 4.024 | 4.024 | 4.024 | 4.024 | 4.024 | 4.024 |
| 0.80 | 3.417 | 3.553 | 3.700 | 3.854 | 4.024 | 4.024 | 4.024 | 4.024 | 4.024 | 4.024 | 4.024 | 4.024 |
| 0.75 | 3.470 | 3.605 | 3.753 | 3.904 | 4.024 | 4.024 | 4.024 | 4.024 | 4.024 | 4.024 | 4.024 | 4.024 |
| 0.70 | 3.523 | 3.658 | 3.804 | 3.961 | 4.024 | 4.024 | 4.024 | 4.024 | 4.024 | 4.024 | 4.024 | 4.024 |
| 0.65 | 3.579 | 3.714 | 3.854 | 4.019 | 4.024 | 4.024 | 4.024 | 4.024 | 4.024 | 4.024 | 4.024 | 4.024 |
| 0.60 | 3.636 | 3.772 | 3.911 | 4.024 | 4.024 | 4.024 | 4.024 | 4.024 | 4.024 | 4.024 | 4.024 | 4.024 |
| 0.55 | 3.696 | 3.828 | 3.975 | 4.024 | 4.024 | 4.024 | 4.024 | 4.024 | 4.024 | 4.024 | 4.024 | 4.024 |
| 0.50 | 3.724 | 3.887 | 4.024 | 4.024 | 4.024 | 4.024 | 4.024 | 4.024 | 4.024 | 4.024 | 4.024 | 4.024 |
| 0.45 | 3.724 | 3.897 | 4.024 | 4.024 | 4.024 | 4.024 | 4.024 | 4.024 | 4.024 | 4.024 | 4.024 | 4.024 |
| 0.40 | 3.724 | 3.897 | 4.024 | 4.024 | 4.024 | 4.024 | 4.024 | 4.024 | 4.024 | 4.024 | 4.024 | 4.024 |
| 0.35 | 3.724 | 3.897 | 4.024 | 4.024 | 4.024 | 4.024 | 4.024 | 4.024 | 4.024 | 4.024 | 4.024 | 4.024 |
| 0.30 | 3.724 | 3.897 | 4.024 | 4.024 | 4.024 | 4.024 | 4.024 | 4.024 | 4.024 | 4.024 | 4.024 | 4.024 |
| 0.25 | 3.724 | 3.897 | 4.024 | 4.024 | 4.024 | 4.024 | 4.024 | 4.024 | 4.024 | 4.024 | 4.024 | 4.024 |
| 0.20 | 3.724 | 3.897 | 4.024 | 4.024 | 4.024 | 4.024 | 4.024 | 4.024 | 4.024 | 4.024 | 4.024 | 4.024 |
| 0.15 | 3.724 | 3.897 | 4.024 | 4.024 | 4.024 | 4.024 | 4.024 | 4.024 | 4.024 | 4.024 | 4.024 | 4.024 |
| 0.10 | 3.724 | 3.897 | 4.024 | 4.024 | 4.024 | 4.024 | 4.024 | 4.024 | 4.024 | 4.024 | 4.024 | 4.024 |
| 0.05 | 3.724 | 3.897 | 4.024 | 4.024 | 4.024 | 4.024 | 4.024 | 4.024 | 4.024 | 4.024 | 4.024 | 4.024 |
| 0.00 | 3.724 | 3.897 | 4.024 | 4.024 | 4.024 | 4.024 | 4.024 | 4.024 | 4.024 | 4.024 | 4.024 | 4.024 |

DETERMINISTIC CURRENT BASED FREQUENCY OPTIMIZATION OF PROCESSOR CHIP

CROSS-REFERENCE TO RELATED APPLICATIONS

This application is related to U.S. patent application Ser. No. 14/814,901, titled "Management of Core Power State Transition in a Microprocessor," filed concurrently herewith, the contents of which are incorporated herein by reference.

BACKGROUND

The present disclosure relates to a method for operating a processor, and more specifically, a method for adjusting a frequency of a processor.

Microprocessors are generally specified to operate at a maximum frequency at maximum power and maximum workload. When the workload is less than the maximum, an extra power margin exists that can be used to increase the frequency and the work that the processor can perform. At any operating frequency, the microprocessor should stay within acceptable limits for power, operating voltage, temperature, and current.

SUMMARY

According to another embodiment, a system is disclosed herein. The system includes a processor and a memory. The memory stores program code, which, when executed on the processor, performs an operation for adjusting a frequency of a processor. The operation includes determining a total current and a temperature of the multi-core processor and estimating a leakage current for the multi-core processor. The operation also includes calculating a switching current by subtracting the leakage current from the total current. The operation includes calculating an effective switching capacitance based at least in part on the switching current. The operation also includes calculating a workload activity factor by dividing the effective switching capacitance by a predetermined effective switching capacitance stored in vital product data, and enforcing a turbo frequency limit of the multi-core processor based on the workload activity factor.

According to yet another embodiment, a computer-readable storage medium having computer-readable program code embodied therewith, that when executed by a processor, causes a processor to perform an operation for adjusting frequency of a processor. The computer-readable program code includes code configured to determine a total current and a temperature of the multi-core processor and to estimate a leakage current for the multi-core processor. The computer-readable program code includes code configured to calculate a switching current by subtracting the leakage current from the total current. The computer-readable program code includes code configured to calculate an effective switching capacitance based at least in part on the switching current. The computer-readable program code includes code configured to calculate a workload activity factor by dividing the effective switching capacitance by a predetermined effective switching capacitance stored in vital product data and enforce a turbo frequency limit of the multi-core processor based on the workload activity factor.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A and 5B illustrate example frequency uplift tables according to one embodiment.

For clarity, identical reference numerals have been used, where applicable, to designate identical elements that are common between figures. Additionally, elements of one embodiment may be adapted for use with other embodiments.

DETAILED DESCRIPTION

In embodiments described herein, the frequency of a processor can be adjusted based on the workload of the processor. When the workload is below a maximum workload for the processor, there is extra power margin that can be used to increase the frequency and the work that the processor can be doing. In one embodiment, performance characteristics of each chip are determined during testing, along with allowable operating states of frequency and voltage. These characteristics, in addition to measurements taken during runtime, are used to determine an increase of the frequency (and voltage) of a chip when allowable, as discussed in further detail below. Another scenario where frequency boosting can be used is when one or more processor cores are power gated, allowing the running cores to operate at a higher frequency. The embodiments herein describe a frequency boost that is deterministic with respect to workload and active core count and independent of the operating temperature. This deterministic frequency boost, in exemplary embodiments, is intended to be uniform across chips with the identical manufacturing specification (i.e., belonging to the same chip "sort"), within the measurement of the runtime sensors.

Figure 1:
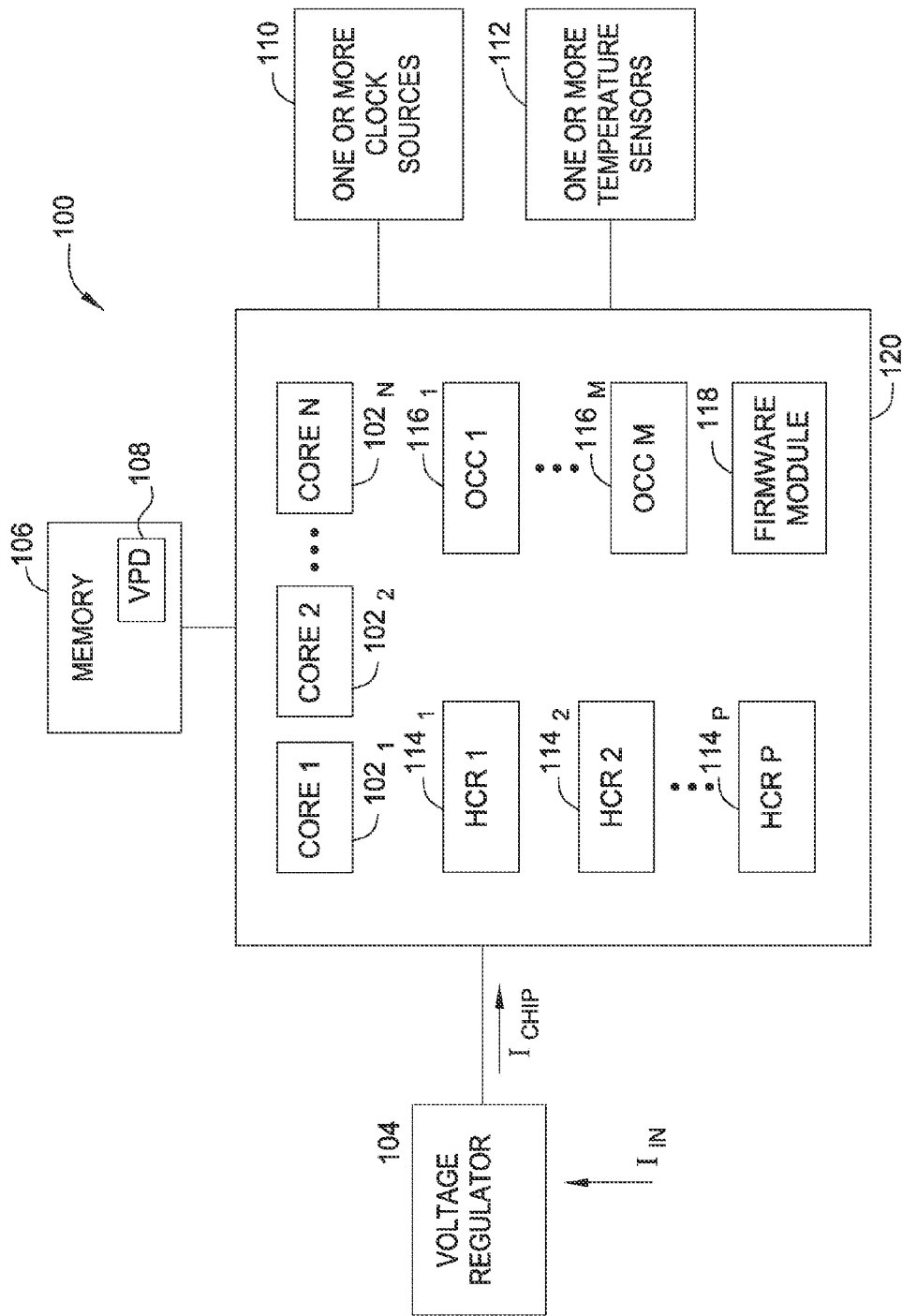
FIG. 1 illustrates a block diagram of a computer system, according to one embodiment disclosed herein.

FIG. 1 illustrates a computer system 100 according to one embodiment. The computer system 100 includes a chip 120 that includes one or more processor cores 102, shown as Core 1, Core 2, . . . , Core N. Embodiments described herein may utilize any number N of processor cores. In other embodiments, components of system 100 shown as on chip 120 may be located off the chip, and components of system 100 shown as off chip 120 may be located on the chip.

Computer system 100 further comprises a voltage regulator 104. Voltage regulator 104 provides power to chip 120. An input current $I_{IN}$ to the voltage regulator 104 may be measured using any suitable mechanism. In addition, a current $I_{CHIP}$ from the voltage regulator 104 to the chip 120 may also be measured using any suitable mechanism.

Computer system 100 also comprises memory 106. Memory 106 may comprise a random access memory (RAM), a read-only memory (ROM), an erasable programmable read-only memory (EPROM or Flash memory), an optical storage device, a magnetic storage device, or any suitable combination of the foregoing. Vital product data (VPD) 108 may be stored in memory 106. VPD 108 may be stored on Serial Electrically Erasable Programmable Read Only Memory (SEEPROM) in one embodiment. VPD 108 is a collection of configurational and informational data associated with the chip. VPD 108 will be described in further detail below.

Computer system 100 further comprises one or more clock sources 110 and one or more temperature sensors 112. Clock sources 110 are used to provide various clock signals to the chip 120. Temperature sensors 112 provide various temperature measurements associated with computer system 100. Any suitable number of temperatures sensors 112 may be used, and the temperatures sensors 112 may be any appropriate type of sensor.

Computer system 100 also comprises hardware control registers (HCR) 114. Embodiments described herein may utilize any number P of HCRs 114, and each HCR 114 may be any length. HCRs 114 store bits of information that can be read out or written. HCRs 114 may be used to store information about the status of certain components of computer system 100. As one example, an HCR 114 may store a bit for each processor core 102 that denotes whether each processor core 102 is currently active or idle.

Computer system 100 may comprise one or more on-chip controllers (OCC) 116. Any number M of OCCs may be utilized. OCCs 116 may run firmware from firmware module 118 to perform various tasks for computer system 100. Certain steps of the embodiments described herein may be run or performed by an OCC 116 in conjunction with firmware from firmware module 118.

Figure 2:
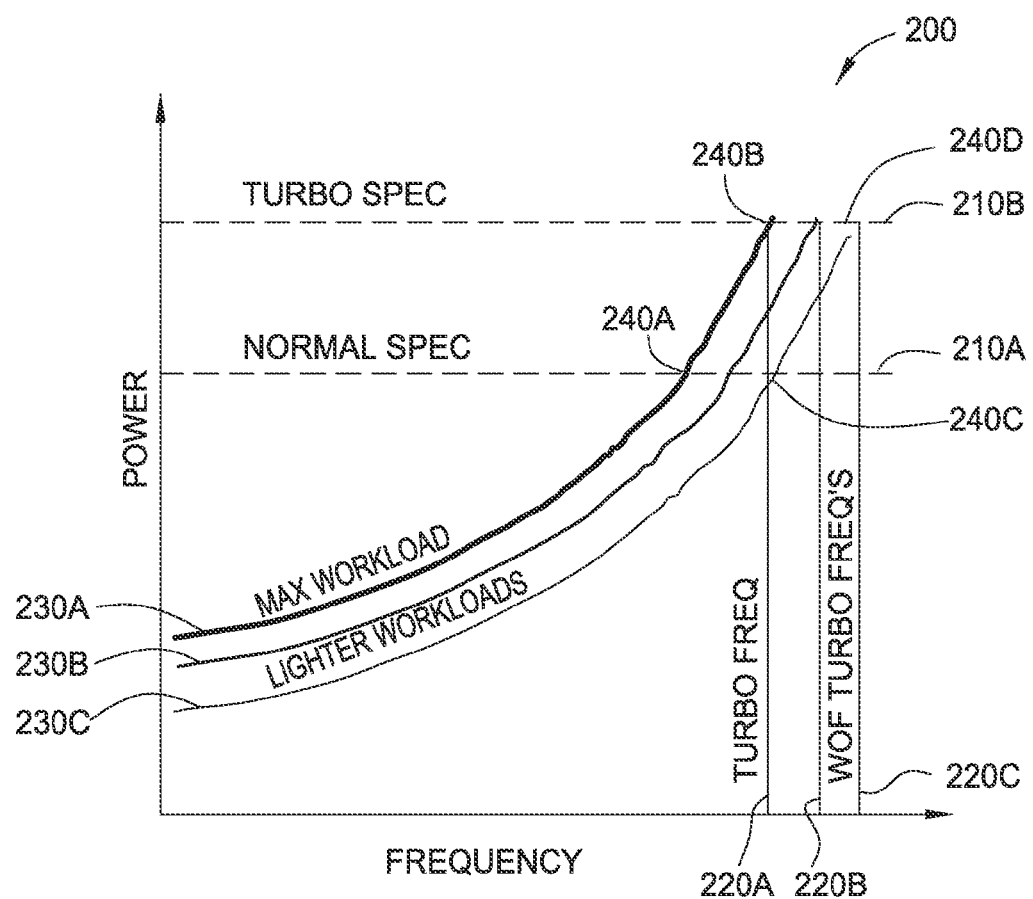
FIG. 2 illustrates an example workload graph, according to one embodiment disclosed herein.

FIG. 2 illustrates a workload graph 200 according to one example embodiment. Three example workloads are illustrated: a max workload 230A and lighter workloads 230B and 230C. The workload curves illustrate points on a frequency and power spectrum. Movement along the workload curves to the right illustrates increasing frequency and increasing power. The horizontal line labeled Nominal Specification 210A is a specification that the microprocessor is rated for, such as 130 watts, for example. A turbo specification 210B is also shown, for operating the microprocessor in a turbo mode.

Illustrated along the horizontal axis in FIG. 2 are frequencies such as turbo frequency 220A and workload-optimized frequency (WOF) turbo frequencies 220B and 220C. The WOF turbo frequencies 220B and 220C illustrate frequencies above a turbo frequency that may be obtained according to certain embodiments of the present disclosure.

As shown in FIG. 2, under a maximum workload at the nominal power specification the processor is operating at point 240A. Under a maximum workload at the turbo frequency, the operating point moves up the workload curve to 240B, which is the point where the turbo frequency 220A line intersects with the turbo specification 210B line.

If the processor is operating at a lighter workload, such as workload curves 230B or 230C, the frequency can be increased beyond the turbo frequency 220A while the power remains below the turbo specification 210B line. At the lightest workload (230C), the processor operates at the nominal power specification 210A while at the turbo frequency 220A (as shown by point 240C). Because the lighter workload is at the nominal specification 210A while operating at turbo frequency 220A, the frequency can be increased beyond turbo frequency 220A and the processor can still operate below the turbo specification 210B. One example of this operating state is illustrated as point 240D. In other words, at lighter workloads, the frequency can be increased beyond the turbo frequency to a WOF turbo frequency while still remaining within power specifications for the chip.

A mode of the processor operation is defined by a voltage-frequency combination. An extensive analysis of each chip is performed during the manufacturing process to determine characteristics of the chip at various operating conditions (known as Module Test). Information about the operation of the chip can be stored in Vital Product Data (as shown in FIG. 1) and that information can be utilized during operation of the chip to determine operating modes. As one example, voltage-frequency combinations can be determined for nominal, turbo, and power saving modes for any number of active cores of the processor. This data may be stored in a lookup table or in any other suitable manner. Then, during operation, the tables are consulted to determine safe operating frequencies for the chip.

For a given workload, one goal of the example embodiments is to determine what a top-end frequency should be for the chip (i.e., a turbo frequency limit). To compare workloads to see if frequency can be increased or decreased, effective switching capacitance can be used. An effective switching capacitance of a workload can be measured and compared to a reference switching capacitance determined during manufacturing and stored in VPD. This comparison determines if the frequency can adjusted. By using the effective switching capacitance of the workload (or a switching current related to the workload), the frequency uplift of the chip is part-independent. That is, the frequency uplift does not depend on the various physical characteristics of the electronic components, but only depends on the workload.

Effective switching capacitance is related to the switching current in the processor. In addition to a switching current, the processor also has leakage current. Leakage current is present whenever voltage is applied to the processor or its cores, even if no workload is running Switching current can be determined by subtracting leakage current from the total current of the chip. Once switching current is determined, effective switching capacitance for the chip can be determined using a formula.

A workload activity factor can then be determined by dividing the computed effective switching capacitance by a maximum effective switching capacitance determined during manufacturing. The workload activity factor is less than 1 when the effective switching capacitance is lighter than the reference workload, equals 1 when the effective switching capacitance is substantially similar to the reference workload, and is greater than 1 when the effective switching capacitance exceeds the reference workload. With the workload activity factor, a lookup table can be consulted to determine how high the frequency can be raised. A separate table may be used for each core count of the processor. The lookup table provides a safe operating frequency (the turbo frequency limit) in order for the chip to stay within the power constraints. One constraint concerns whether the chip can be cooled effectively if it is operated at this frequency for the long term. A second constraint concerns the short term current limit that the voltage regulator can sustain. Both constraints should be respected for the chip to operate at a safe operating point. The various constraints may be held in a single table that specifies the minimum frequency across all constraints. Alternatively, the individual constraints could be in independent tables which are consulted, with the lowest (safe) frequency value returned across all tables used as the final safe operating frequency (i.e., the turbo frequency limit).

Embodiments of the present invention are associated with a particular voltage domain of a chip. The invention could be applied multiple times across multiple voltage domains. If the same clock frequency is applied to circuits operating in two domains, for example, then the lower frequency determined in each voltage domain would ultimately clip the frequency.

Figure 3:
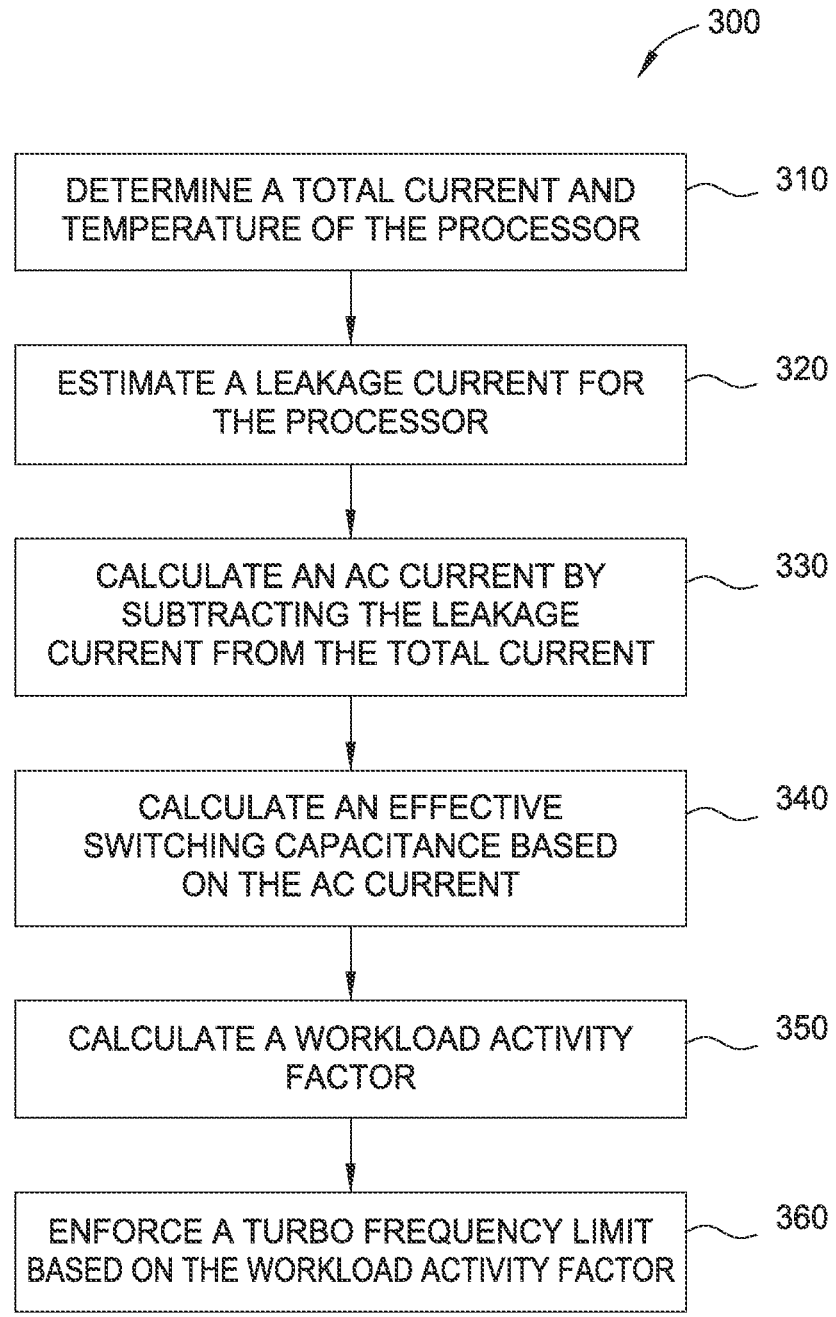
FIG. 3 illustrates a flowchart of a method for adjusting a frequency of a processor, according to one embodiment disclosed herein.

FIG. 3 is a flowchart of a method for adjusting a frequency of a processor by enforcing a turbo frequency limit. Although the method steps are described in conjunction with the systems of FIGS. 1-2, persons skilled in the art will understand that any system configured to perform the method steps, in any order, falls within the scope of the present invention. In various embodiments, the hardware and/or software elements described above in FIGS. 1-2 can be configured to perform the method steps of FIG. 3. In some embodiments, an on-chip controller 116 illustrated in FIG. 1 can perform some or all of the steps in FIG. 3 by executing logic embodied in firmware. The steps can be executed on a regular timing interval. As one example, the time interval can be in the vicinity of tens of microseconds.

As shown, a method 300 begins at step 310 where the method determines a total current and a temperature of the multi-core processor. The total current can comprise the current going into the voltage regulator. Any suitable hardware or software may be utilized to measure this current. To determine how much current makes it to the chip itself, a model of the efficiency of the regulator may be used. Logic may be used to estimate the efficiency of the regulator, which can change depending on voltage and other factors. The temperature of the chip may be measured using thermal sensors on the chip. An average temperature of multiple thermal sensors may be used. In other embodiments, thermal characteristics of the chip may be used to estimate the chip temperature instead of directly measuring temperature using sensors.

At step 320, a leakage current (or DC current) is estimated for the chip. For the existing voltage and temperature condition of the chip, VPD may be used to estimate the chip leakage current. Specifically, leakage currents for each chip may be determined during manufacturing for various voltage and temperature conditions and stored in the VPD. Leakage current may be measured for a range of voltage values, at a controlled temperature environment during manufacturing. VPD may be stored on a SEEPROM, as described above. Interpolation may be used on the leakage current measurements stored in VPD to determine leakage current at the exact operating conditions. Other adjustments may be made to the leakage current in some embodiments, such as scaling for temperature. Leakage current measurements stored in VPD may be measurements corresponding to all cores being power-gated on. If fewer than the maximum cores on the chip are power-gated on, the leakage current measurements can be multiplied by M/N, where M is the power-gated on core count and N is the maximum number of cores that can be power-gated on. Logic can determine the power-gated on core count by reading a status stored in a hardware control register, as illustrated in FIG. 1. Note that for this example, power-gated off cores consume no power. In other examples, cores that are idle but not power-gated off may still consume some amount of power.

At step 330, switching current is calculated by subtracting the leakage current computed in step 320 from the total current computed in step 310. In addition, the switching current can be normalized to a thermal design point (TDP) switching current determined at Module Test.

At step 340, the switching current is used to calculate an effective switching capacitance for the running workload. One formula that may be used to determine effective switching capacitance ($C_{eff}$) in certain embodiments is:

$$C_{eff_{workload}} = \frac{I_{AC}}{v^{1.2} * f}$$

where $I_{AC}$ is the switching current, v is the processor voltage, and f is the processor frequency. In other embodiments, more complicated formulas may be used that consider additional factors, such as accounting for resonant clock and cross-currents, or adjusting the switching current for clock distribution, eDRAM refresh, and analog current components.

At step 350, a workload activity factor is calculated by dividing the effective switching capacitance by a predetermined effective switching capacitance stored in VPD. The effective switching capacitance stored in VPD may be the effective switching capacitance of the maximum power workload that is measured during manufacturing. The workload activity factor is a value as described above that may be less than 1, approximately 1, or greater than 1. This factor is used to determine how high the frequency can be raised.

At step 360, the turbo frequency limit of the multi-core processor is enforced based on the workload activity factor. A frequency lookup table stored in VPD can be consulted to determine the turbo frequency limit associated with the calculated workload activity factor. The frequency lookup table is determined during manufacturing, and any suitable method may be used to generate the table. Interpolation of the values in the table may be used to select the turbo frequency limit. The turbo frequency limit sets a safe cap on the frequency requested by the operating system. Energy-saving algorithms may be used to request a lower frequency if the highest performance is not required. In some embodiments, a new voltage may be computed by power management firmware when the turbo frequency limit is found. The new voltage may also be read from a lookup table stored in ROM.

Figure 4:
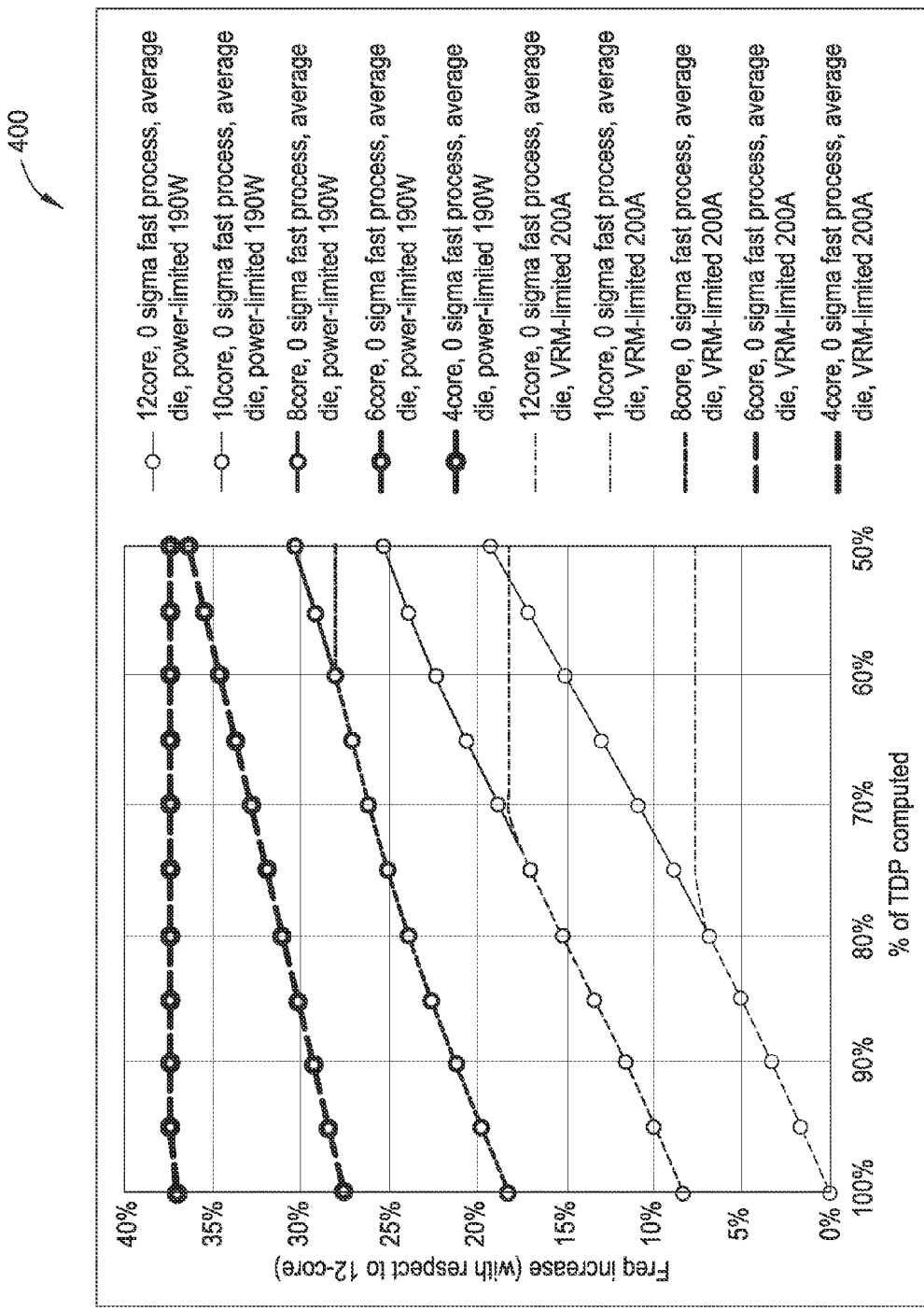
FIG. 4 illustrates an example frequency lookup table, according to one embodiment disclosed herein.

FIG. 4 illustrates an example frequency lookup table 400 (or frequency uplift table). In this example, a 12-core processor is used as a baseline, with all cores powered up, running the highest-power TDP workload. The X-axis illustrates the switching current (also known as AC current) percentage, while running a specific workload, relative to the TDP workload (reference workload). For example, the 90% point on the X-axis represents a workload that is 90% of the power of the TDP workload. The Y-axis illustrates the frequency boost relative to the nominal mode point. The nominal mode point corresponds to the 12-core processor, with all 12 cores running the TDP workload. The voltage-frequency combination for the nominal mode is stored in VPD.

Five groups of lines are illustrated in table 400, with each group corresponding to the number of cores that are powered on: 12, 10, 8, 6, or 4 cores. For each of the core counts there are two curves in table 400: one that corresponds to the unlimited voltage regulator capacity, and one that has an additional limitation on the frequency uplift imposed by the voltage regulator current limits.

The reduced core count configurations have a higher frequency than higher core count configurations, even with running the TDP workload. This is because the power of the power gated cores can be used by the running (active) cores, allowing the running cores to operate at a higher voltage and frequency. The voltage regulator (VRM) current limited frequency uplifts are also higher for configurations with reduced core count.

In the example illustrated in FIG. 4, the voltage regulator has 200 Amps of current capacity. The frequency uplift for the 12-core configuration is limited to approximately 7.5%, achieved at 80% of the dynamic power of the TDP workload. Any further reduction in the workload does not allow any additional frequency boost, because of the voltage regulator current limits. If there is a quick change in the workload, resulting in the maximum current consumption, the current will not exceed the 200 A limit.

Powering down two of the twelve cores allows the frequency to be boosted between from 8% to 18%, depending on the workload activity. Powering down four of the twelve cores increases the frequency boosting opportunity to 18% for the most power-intensive workload. With the reduction in processor workload switching current, the frequency boost potential for the 8-core configuration increases to 28%. For the 8-core configuration, the limited voltage regulator capacity only limits the frequency boost potential by 2%. For the six and four-core configurations the limited voltage regulator capacity does not have any impact on the frequency boosting opportunity. For the four-core configuration, a nearly maximum frequency boost is achieved even for the power-heavy workload. Any reduction in the utilization of the running cores allows for only 1% of additional frequency boosting in this example.

The frequency boosting for any of the scenarios is limited to about 38% in this example, because of the limitations on maximum voltage ($V_{MAX}$). For configurations running into the $V_{MAX}$ limitation, the processor voltage is set at $V_{MAX}$, and the frequency is set accordingly. Any further reduction of the workload activity or the core count is inconsequential to the frequency.

FIGS. 5A and 5B illustrate example frequency uplift tables according to one embodiment. FIG. 5A illustrates a frequency uplift percentage relative to a turbo frequency of 3.226 GHz. The AC column represents the workload activity factor, as described above. A column for each number of active cores illustrates the frequency uplift percentage for different values of AC. As one example, with 12 active cores, and a workload activity factor of 0.70, the frequency uplift is 9.2%. As shown in FIG. 5A, with any number of cores from 1 to 7, the frequency uplift is 24.7% for any value of AC. The frequency uplift is limited in those situations due to VRM limits.

FIG. 5B is similar to FIG. 5A, except absolute frequency values (in GHz) are shown in the table instead of frequency uplift percentages. As one example, with 11 active cores and an AC of 0.50, the frequency can be set to 3.887 GHz. The maximum frequency that can be achieved, as shown in the table, is 4.024 GHz.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
a processor; and
a memory, wherein the memory includes a program configured to adjust a frequency of a multi-core processor, the operations comprising:
determining a total current and a temperature of the multi-core processor;
estimating a leakage current for the multi-core processor;
calculating a switching current by subtracting the leakage current from the total current;
calculating an effective switching capacitance based at least in part on the switching current;
calculating a workload activity factor by dividing the effective switching capacitance by a predetermined effective switching capacitance stored in vital product data;
adjusting the frequency of the multi-core processor to increase the workload of the multi-core processor; and
enforcing a turbo frequency limit of the multi-core processor based on the workload activity factor.

2. The system of claim 1, wherein estimating the leakage current comprises using vital product data to estimate the leakage current for a voltage and temperature condition.

3. The system of claim 2, wherein estimating the leakage current further comprises adjusting the leakage current for a number of active cores of the multi-core processor.

4. The system of claim 1, wherein calculating the switching current further comprises normalizing the switching current to a predetermined thermal design point switching current.

5. The system of claim 1, wherein enforcing the turbo frequency limit of the multi-core processor further comprises enforcing the turbo frequency limit based on a number of active cores of the multi-core processor.

6. The system of claim 1, wherein enforcing the turbo frequency limit of the multi-core processor further comprises enforcing the turbo frequency limit to be within a predetermined power limit.

7. The system of claim 1, wherein enforcing the turbo frequency limit of the multi-core processor further comprises utilizing a lookup table of frequencies to determine the frequency.

8. The system of claim 1, the operations further comprising:
adjusting a voltage of the multi-core processor to increase the workload of the multi-core processor.

9. A computer program product for adjusting a frequency of a multi-core processor, the computer program product comprising:
a non-transitory computer-readable medium program having program instructions embodied therewith, the program instructions executable by a processor to perform an operation comprising:
determining a total current and a temperature of the multi-core processor;
estimating a leakage current for the multi-core processor;
calculating a switching current by subtracting the leakage current from the total current;
calculating an effective switching capacitance based at least in part on the switching current;
calculating a workload activity factor by dividing the effective switching capacitance by a predetermined effective switching capacitance stored in vital product data;
adjusting the frequency of the multi-core processor to increase the workload of the multi-core processor; and
enforcing a turbo frequency limit of the multi-core processor based on the workload activity factor.

10. The computer program product of claim 9, wherein estimating the leakage current comprises using vital product data to estimate the leakage current for a voltage and temperature condition.

11. The computer program product of claim 10, wherein estimating the leakage current further comprises adjusting the leakage current for a number of active cores of the multi-core processor.

12. The computer program product of claim 9, wherein calculating the switching current further comprises normalizing the switching current to a predetermined thermal design point switching current.

13. The computer program product of claim 9, wherein enforcing the turbo frequency limit of the processor further comprises enforcing the turbo frequency limit based on a number of active cores of the multi-core processor.

* * * * *